United States Patent [19]

Asonen

[11] Patent Number: 4,527,046
[45] Date of Patent: Jul. 2, 1985

[54] METHOD AND ARRANGEMENT FOR UNDERWATER ARC WELDING

[76] Inventor: Osmo Asonen, Peräläntie 22, 11120 Riihimäki, Finland

[21] Appl. No.: 571,872
[22] PCT Filed: Apr. 26, 1983
[86] PCT No.: PCT/FI83/00035
  § 371 Date: Dec. 22, 1983
  § 102(e) Date: Dec. 22, 1983
[87] PCT Pub. No.: WO83/03787
  PCT Pub. Date: Nov. 10, 1983

[30] Foreign Application Priority Data

Apr. 26, 1982 [FI] Finland .................. 821440

[51] Int. Cl.³ .................. B23K 9/02
[52] U.S. Cl. .................. 219/137 R; 219/72
[58] Field of Search .................. 219/72, 137 R

[56] References Cited

U.S. PATENT DOCUMENTS 3,941,974 3/1976 Kano et al. .................. 219/137 R
4,069,408 1/1978 Masubuchi et al. .................. 219/72

FOREIGN PATENT DOCUMENTS 2023476 1/1980 United Kingdom .................. 219/72

Primary Examiner—Roy N. Envall, Jr.
Assistant Examiner—C. M. Sigda
Attorney, Agent, or Firm—Biebel, French & Nauman

[57] ABSTRACT

A method and an arrangement are described for underwater arc welding in which the welding electrode is placed into the zone to be welded in lying position, the electrode being covered with a shield structure and ignited so that, when electrode burning occurs, it produces the desired weld at the zone to be welded. A mantle is used as the shield structure and comprises an inner burning layer made of a readily burning, preferably resilient material, by means of which the electrode is covered, and an outer protective layer, preferably made of a flexible material, by means of which the burning layer is covered, and fastening means, by which the mantle is fixed firmly and tightly in position. The fire gases produced during the burning of the electrode and of the burning layer prevent penetration of water to the electrode.

9 Claims, 10 Drawing Figures

METHOD AND ARRANGEMENT FOR UNDERWATER ARC WELDING

The present invention relates to a method applicable to underwater arc welding.

The method is suitable only for the so-called Elin welding, wherein the electrode is not burned in the normal way as perpendicular to the object to be welded, but the electrode is placed lying on the parent material and is melted in this position like a fuse without participation of the welding operator in the process.

The invention also relates to an arrangement to be used for carrying out the method.

In prior art, a so-called "fire-cracker" method is known, in which one or several thick-coated electrodes placed in a groove are covered with a copper rail which accommodates one or several furrows for the electrodes. Into the space produced, gas is passed, usually air, whereby the water in the space is displaced. For igniting the light arc, either a thin wire fuse or a metal foil is used, upon whose destruction the arc of light starts burning between the electrodes and the parent material. The maximum length of the electrodes when welding on the ground is about 1 meter. It has, however, been noticed that in water it is possible to use electrodes twice as long. It is however, a drawback of this method that an external pressure-gas source is required in order to eliminate the water. This is inconvenient, especially when the welding is performed in deep waters. Moreover, it is difficult to make and to install the copper rail on several welding objects which are not straight or even, such as pipe joints.

From the U.S. Pat. No. 4,069,408, a method is known according to which the area to be welded is covered by means of a box-shaped structure that contains various pastes and powders and whose top portion is provided with a groove along which the vertically positioned welding electrode can be shifted. It is a drawback of this method that, as the welding area is out of sight, the welding must be performed "blindfold"

The object of the present invention is to eliminate the drawbacks present in the prior art technology and to provide a more practical method and arrangement of a novel type for underwater arc welding.

Another objective of use of the invention is to provide a dry space within the area of the arc and to prevent access of water onto the slag and weld melt about to be cooled.

The invention is based on the idea that by fitting both the electrode and the material covering the electrode tightly onto the object to be welded, which said material generates a gas while the arc is burning, the water can be displaced automatically.

In the method in accordance with the present invention, the object to be welded is first covered, over the entire distance to be welded, with a water-repellent semi-solid material, which is in the following called sealing material. It must be spread over an area as wide as possible and with a thickness of at least 1 cm. Hereupon the welding electrode is pressed into the sealing material so that it is parallel to the parent material to be welded and to the intended weld seam. After the welding electrode has been covered completely in the water-repellent sealing material, a resilient heat insulation board of solid material is pressed onto the material so tightly that it presses the electrode against the parent material. The heat insulation board is almost equally long as the electrode to be welded and wide enough so that the sealing material remains covered by the insulation board with the exception of any excessive sealing material extruded from the sides of the insulation material. The initial end of the electrode as well as its final end are allowed to remain visible for the purpose of ignition so that the electrode holder can be attached to the electrode. Hereupon the electrode can be ignited by instantaneously short-circuiting its initial end, e.g., by means of a carbon rod. When the arc is ignited, a tunnel is produced in the heat insulation when the electrode burns. Since the fire gases produced escape along this tunnel, water cannot follow the arc while the arc proceeds inside the heat insulation and the sealing material. The gas pressure produced by the fire gases in the tunnel is sufficient to keep the water out as long as the electrode is burning. Shortly before the electrode has burnt out, the initial end of the tunnel is covered with a large piece of sealing material in order that the water could not flow into the tunnel after burning out of the electrode and cool the weld seam produced. Nor must the final end of the electrode be burnt so far that the tunnel is burnt through at that end. This tunnel may also burn through at the top unless the heat insulation is thick enough. The heat insulation board may be removed after about 15 seconds from the end of the welding. Since the weld seam now produced was all the time isolated from water, its properties correspond to the properties of welds produced in a dry chamber.

By means of the invention, remarkable advantages are achieved. Thus, the method according to the invention eliminates the water from the area of arc during the welding and thereby reduces the high rate of cooling of the weld, which has constituted a drawback in conventional methods of submerged welding.

As an additional advantage, as compared with the dry-chamber methods, may be considered that the fire gases produced from the electrode, from the heat insulation and from the sealing material are very hot, which is advantageous in view of the requirement of lowering the rate of cooling of the weld melt.

The invention will be examined below in more detail with the aid of the exemplifying embodiments in accordance with the attached drawings.

EXAMPLE 1

Figure 1:
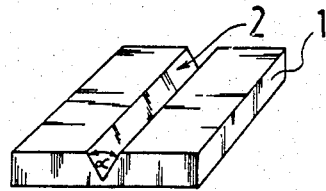
FIG. 1 is an axonometric view of a test sheet to be welded, provided with a V groove.
Figure 2:
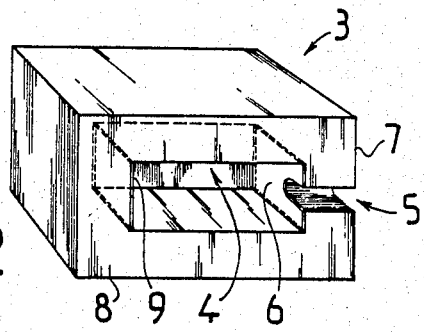
FIG. 2 is an axonometric view of an enclosure made of foam rubber and open at the bottom.
Figure 3:
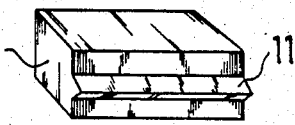
FIG. 3 is an axonometric view of a board of insulation material provided with a projecting ridge.

The sheet 1 to be welded was of carbon-manganese steel Fe 52 D produced by the Finnish steel company Rautaruukki Oy, whose carbon equivalent was 0.40. In the middle of the sheet 1, in the longitudinal direction, a V groove 2 ($\alpha=70°$, FIG. 1) had been cut. For fill welding of this groove 2, a shield in accordance with the invention was prepared. The outermost part of the shield consists of an enclosure 3 made of foam rubber and open at the bottom, as shown in FIG. 2. The empty space 4 of $220\times75\times40$ mm$^3$ remaining inside the enclosure 3 is filled with a resilient styrofoam sheet 10, which had been provided with a projection 11 fitting into the V groove of the sheet (FIG. 3). One end wall 7 of the rubber enclosure 3 was, at the bottom edge, provided with a notch-like opening 5 for the removal of the fire gases. In order that the hot gas flows should not gradually burn the opening 5 larger, both ends of the opening 5 were reinforced by means of metal plates 6, whereby it is also possible to adjust the size of the notch 5 by shifting the said plates 6. The end wall 8 at the final end of the rubber enclosure 3 was also protected by a metal plate 9 in order that the light arc and the welding gases should not burn a hole through the end wall 8 at the final end.

Figure 4:
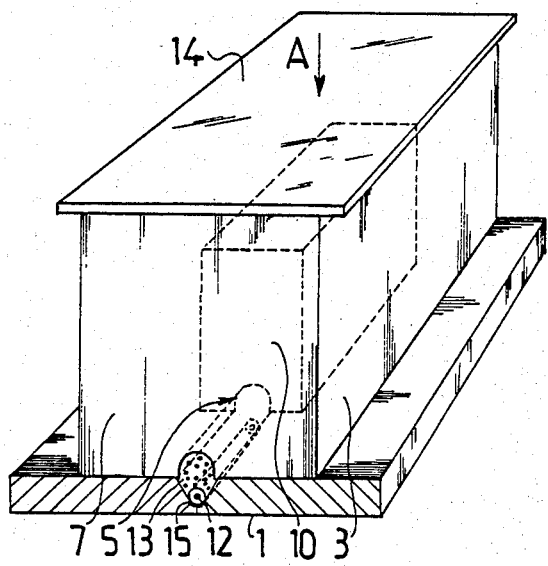
FIG. 4 is an axonometric sectional view of one welding arrangement in accordance with the invention.

When the welding was started, the welding rod or electrode 12 was first placed onto the bottom of the V groove 2. Hereupon, a protective board 10 as described above, preferably made of styrofoam, was placed onto the electrode 12. The V-shaped projection 11 of the board 10 was fitted into the V groove 2 of the sheet 1 to be welded. The function of this projection 11 was to press the welding electrode 12 and its covering 15 tightly to the bottom of of the V groove 2 and to displace any water placed around the electrode 12 as completely as possible. The protective board 10 placed onto the electrode 12 was then pressed tightly against the sheet 1 to be welded. Since the styrofoam board was made of a resilient material, the electrode 12 was pressed slightly into the insulation material, which favoured the elimination of the water around the electrode 12. The compression (arrow A, FIG. 4) was in this case produced by means of a screw press, not shown, and a pressure plate 14. Hereupon the grounding wire was attached to the sheet 1 and the electrode holder to the core wire of the rod 12 coming through the rear end wall 8 of the shield enclosure 3. The initial end of the rod 12 seen in the opening 5 at the other end wall 7 was short-circuited by means of a carbon rod, whereby the welding electrode 12 started burning. The fire gases from the insulation 10, 13 burning around the welding electrode 12 and from the welding electrode 12 itself escaped at a high pressure through the small gas exhaust opening 5, thereby preventing the water outside the shield enclosure 3 from following the arc into the enclosure 3. The electrode 12 burnt out slightly before the rear end wall 8 and was then extinguished by itself. After the rod 12 had been extinguished, the gas pressure in the enclosure 3 was reduced rapidly, whereby water started flowing into the enclosure 3 through the gas exhaust opening 5 at the initial end. Even though it would be in itself easy to block the gas exhaust opening 5, e.g., by means of modelling wax, this is not necessary in practice, for the temperature of the weld produced has already by now been lowered well below 500° C. even at the final end of the weld. Thus, the effect of the water cooling the weld no longer has a substantial effect on the diffusion of the hydrogen in the weld, nor can hardening effects be produced any more. Since there was no water in the proximity while the arc was burning, the hydrogen content in the fire gases did not become high either (the dissociation of water to oxygen and hydrogen within the area of the arc was previously one of the major causes of the high hydrogen concentrations in underwater welds).

On completion of the welding, the screw press was detached and the shield enclosure 3 was removed. It was noticed that the styrofoam board 10 inside the enclosure had burnt almost completely, but the enclosure 3 of foam rubber itself had not suffered damage. The slag that had been produced during welding was easy to remove, and the weld produced was very uniform and well-shaped, which was obviously a result of the steady position of the electrode 12 and of uniform burning which proceeded automatically. After the styrofoam remainders had been removed from the rubber enclosure 3 and a new styrofoam board been installed in position, the following bead could be welded in the same way as the first one. As the V groove 2 was being filled, the effective gas exhaust opening 5 was also reduced. This is why the gas exhaust opening 5 was increased by means of the metal plates when the surface beads were being welded.

The X-ray picture taken later of the welded sheet 1 showed no porosity, no slag inclusions, and no joint flaws. The other tests taken from the sheet 1, such as the hardness, bending, and falling weight tests, gave values corresponding to those obtained from a reference sheet welded on the ground.

EXAMPLE 2

Figure 5:
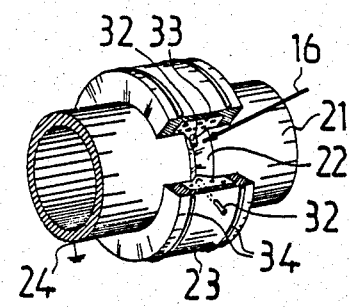
FIG. 5 is an axonometric view of a second welding arrangement in accordance with the invention.
Figure 6:
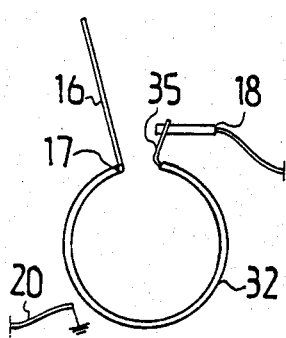
FIG. 6 shows a welding electrode to be used in the arrangement shown in FIG. 5.

The butt welding of the pipe 21 took place in a way corresponding to Example 1. The rubber shield 23 was now made so long that it extended around the pipe 21 with grounding wire 24 (FIG. 5), and the styrofoam sheet 33 was shaped so that it could be pressed tightly around the pipe 21. The outer diameter of the pipe was 150 mm, so that a normal 450 mm long flexible welding electrode 32 extended around the whole pipe 21 (FIG. 6). In order that it should be possible to attach the electrode holder 16 to the initial end 17 of the electrode and that it should be possible to short-circuit the initial end of the electrode 32, a space of about 10 mm had to be left between the initial and final end of the rubber shield 23. In order to facilitate the fastening of the electrode holder 18, having grounding wire 20, the bare core wire portion 35 at the final end of the welding electrode 32 was bent perpendicularly upwards from the face of the pipe 21 (FIG. 6). The rubber shield 23 and the styrofoam layer 33 inside it were pressed around the pipe 21 by means of tensioning bands 34 (FIG. 5) of the type used, e.g., in the packaging industry. An ordinary hose clip with screw tensioning is also well suitable for the purpose. Since the welding was now performed in all positions, i.e. "downhand", vertical and "uphand" positions, the current in the electrode 32 was reduced for the vertical and "uphand" positions by about 15 to 20% as compared with the "downhand" position. In the other respects, the welding took place in accordance with the above Example 1.

EXAMPLE 3

Figure 7:
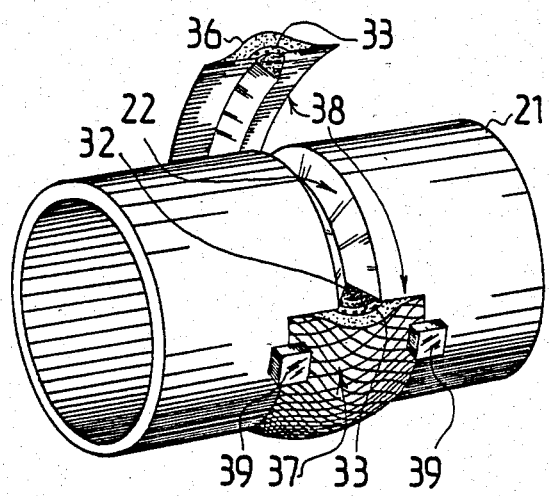
FIG. 7 is an axonometric view of a third welding arrangement in accordance with the invention.
Figure 8:
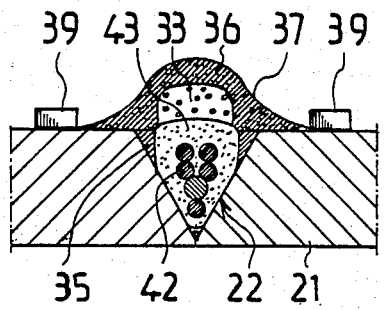
FIG. 8 is a sectional view on an enlarged scale of the welding arrangement shown in FIG. 7.
Figure 9:
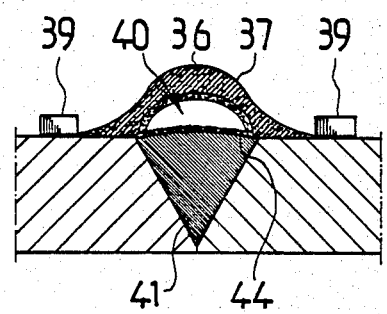
FIG. 9 is a sectional view of a weld produced by means of the arrangement shown in FIG. 8.

FIGS. 7 to 9 show an alternative welding method as applied to the butt welding of pipes 21. According to the method, pasty material has been fitted into the weld groove 22, e.g., a material defined in the Finnish Patent Application No. 802244. Onto this material, a welding electrode 32 has been fitted which comprises a coating 43 made of an elastic material and having a cross-sectional form following the cross section of the groove 22, as well as a core 42 inside the coating 43, the said core consisting of several wires. Onto the welding electrode 32, a styrofoam layer 33 has been applied, and onto this a paste layer 36, which has been spread laterally beyond the outer edges of the groove 22 and which may be provided with an adhesive layer 28. The paste layer 36 is coated with a resilient coating net 37, which keeps the underside 38 of the welding arrangement tightly pressed against the groove 22 and adjacent areas of pipe 21 by means of magnets 39. However, other presses or tapes may be be used in place of magnets 39.

After the welding electrode 32 has been ignited in accordance with Examples 1 and 2, the insulation layer 33 forms a hollow cavity 40 during the progress of burning (FIG. 9), along which cavity the hot weld gases can flow between the slag layer 44 and the paste layer 36 and further out through the initial end of the weld 41. This hot gas flow prevents rapid cooling of the weld 41, whereby the hydrogen can escape from the weld 41. By means of this gas flow, the temperature of the weld 41 can be kept for some time above the so-called Curie point ($>725°$ C.).

Figure 10:
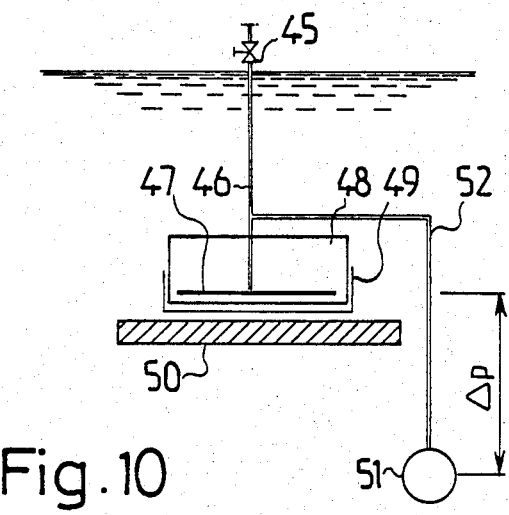
FIG. 10 is a schematical view of a fourth welding arrangement in accordance with the invention.

In the embodiment shown in FIG. 10, after the pressing of the enclosure against the welding base, the water pressure can no longer affect the pressure prevailing within the arc zone, because there is a tight rubber border in between within the edge area of the enclosure. The thin elastic plastic film 49 is also pressed against the edges of the enclosure 48 so tightly that the electrode 47 remains dry and isolated from water. The elastic film 49 does not prevent automatic ignition of the electrode 47 and does not affect the burning of the arc or the quality of the weld.

The elastic ball 51 hanging lower down yields a slight difference $\Delta p$ in pressure through the hose 52, in order that, during the installation, the film should not be pressed by the effect of the water pressure and be broken against small holes possibly present in the enclosure 48.

After installation in position, when the valve 45 placed above the water surface in the hose 46 (connected to the gas exhaust opening earlier) is opened, the normal atmospheric pressure is produced within the arc zone of the enclosure 48, whereby the outer water pressure presses the enclosure tightly against the base, such that a separate pressing by a screw press, magnet, band, etc. is no longer required.

The insulation in the enclosure may be made so that it, instead of air, contains a gas that is at the same time a shield gas for welding. In such a case, the same requirements do no longer have to be imposed on the structure of the coating of the electrode 47 as are necessary when welding is performed in the air.

What is claimed is:

1. A method for underwater arc welding of joints in metallic workpieces of the type in which a welding electrode is placed at a joint to be welded in a lying position and the electrode is ignited to burn and produce a weld at the joint, wherein the improvement comprises the step of:

covering the electrode with a shield prior to electrode ignition, said shield including a mantle having an inner burning layer made of a readily burnable material, an outer protective layer covering said inner layer and means for fastening said mantle to the workpieces, such that the burning of the electrode causes said inner burning layer to burn, thereby producing combustion gases adjacent to the joint to prevent water from contacting the electrode.

2. The method of claim 1 wherein said burning layer is shaped to correspond to a cross section of the joint so that it presses the electrode into position and at least partly fills a space between the electrode and the joint.

3. The method of claim 1 wherein said burning layer is made of a material selected from the group consisting of foam plastic and polystyrene.

4. The method of claim 1, wherein said protective layer is made of a material selected from the group consisting of rubber and foam rubber.

5. The method of claim 1 wherein said outer protective layer comprises a shield paste, resilient net means covering said paste and fastening means for attaching said net means to the workpieces such that said net means presses said paste against the joint.

6. The method of claims 1 or 5 wherein said outer layer includes a portion fitted between the electrode and the joint.

7. An assembly for performing underwater arc welding of joints in metallic workpieces of the type having an extended electrode shaped to lie along a joint to be welded, the improvement comprising:

shield means for covering said electrode and an associated joint, said shield means including a readily-burnable, resilient inner burning layer positioned to cover said electrode in an associated joint, a flexible outer protective layer shaped to cover said inner burning layer and an associated joint, and means for fastening said inner and outer layers to an associated workpiece adjacent a joint thereof.

8. The assembly of claim 7 wherein said outer protective layer comprises a box-like structure open at a portion thereof to be placed against a joint to be welded, said structure being made of a resilient material and having at least one wall with an opening for escape of combustion gases therefrom, and said inner burning layer consists of a board shaped to correspond to an interior space of said box-like structure, said board being made of an insulating plastic material and having a shape in cross section corresponding to a cross sectional shape of a joint to be welded.

9. The assembly of claim 7 wherein said inner and outer layers together comprise a protective paste, a resilient net covering said paste, and means for fastening said net to a workpiece such that said paste is pressed against a joint thereof.

* * * * *